US007006797B1

(12) United States Patent
Sullivan et al.

(10) Patent No.: US 7,006,797 B1
(45) Date of Patent: Feb. 28, 2006

(54) COHERENCE FREQUENCY DETERMINING SYSTEM AND ASSOCIATED RADIO APPARATUS

(75) Inventors: Terence Sean Sullivan, Cambridge, MA (US); Terence Brennan, Melbourne, FL (US)

(73) Assignee: Counter Technologies, LLC, Ely, NV (US)

( * ) Notice: Subject to any disclaimer, the term of this patent is extended or adjusted under 35 U.S.C. 154(b) by 644 days.

(21) Appl. No.: 09/860,506

(22) Filed: May 21, 2001

(51) Int. Cl.
*H04B 17/00* (2006.01)
*H04B 1/18* (2006.01)

(52) U.S. Cl. ............... 455/67.1; 455/67.11; 455/158.3; 455/226.4

(58) Field of Classification Search ............. 455/154.1, 455/158.3, 161.1, 173.1, 179.1, 182.1, 184.1, 455/185.1, 226.1, 226.4, 231, 234.1, 266, 455/69, 67.11, 450, 509, 517, 550.1, 150.1, 455/182.2, 183.2, 423, 339; 324/76.48, 76.62, 324/76.63; 702/75, 78
See application file for complete search history.

(56) References Cited

U.S. PATENT DOCUMENTS

| | | | | |
|---|---|---|---|---|
| 4,350,950 A | * | 9/1982 | Waldmann et al. | 324/76.61 |
| 4,651,089 A | * | 3/1987 | Haigh | 324/76.42 |
| 4,727,591 A | * | 2/1988 | Manlove | 455/182.2 |
| 5,457,716 A | * | 10/1995 | Ang et al. | 375/344 |
| 5,471,402 A | * | 11/1995 | Owen | 702/76 |
| 5,613,232 A | * | 3/1997 | Toshida et al. | 455/226.4 |
| 5,630,220 A | * | 5/1997 | Yano | 455/234.1 |
| 5,634,205 A | * | 5/1997 | Kurisu et al. | 455/182.2 |
| 5,640,698 A | * | 6/1997 | Shen et al. | 455/323 |
| 5,710,710 A | * | 1/1998 | Owen et al. | 702/75 |
| 5,758,296 A | * | 5/1998 | Nakamura | 455/575.7 |
| 5,926,752 A | * | 7/1999 | Lin | 455/323 |
| 5,943,606 A | * | 8/1999 | Kremm et al. | 455/12.1 |
| 6,023,615 A | * | 2/2000 | Bruckert et al. | 348/14.08 |
| 6,335,953 B1 | * | 1/2002 | Sanderford et al. | 375/344 |
| 6,487,399 B1 | * | 11/2002 | Rajaniemi et al. | 455/226.1 |

* cited by examiner

*Primary Examiner*—Simon Nguyen
(74) *Attorney, Agent, or Firm*—Leydig, Voit & Mayer, Ltd.

(57) ABSTRACT

The invention provides an apparatus and a method for determining the frequency of a radio frequency signal. The coherency of a received signal is determined and only the frequency of a coherent signal is determined. Zero amplitude transitions of coherent signals are counted in respective time periods. If the counts in each time period agree within a quantization error, the accumulated counts for a fixed time period are employed to determine a frequency. The frequency determining apparatus and method are particularly useful with a frequency agile radio receiver for detecting the presence of radio frequency signals from nearby mobile and stationary transmitters. Upon determination of the frequency of the nearby transmitter, the channel of transmission can be determined from a memory within the receiver and the receiver can be tuned to monitor the transmission. Additional tests to verify the frequency determination may be applied using squelch and window detector circuits of the radio receiver.

28 Claims, 5 Drawing Sheets

FIG. 1

FIG. 3 part 2

FIG. 4

GGUS 7,006,797 B1

COHERENCE FREQUENCY DETERMINING SYSTEM AND ASSOCIATED RADIO APPARATUS

FIELD OF THE INVENTION

The invention concerns an apparatus for determining the frequency of a received coherent radio frequency signal and a process for determining the frequency of a coherent radio frequency signal. The apparatus and process are particularly useful in radio equipment, such as frequency agile radio receivers and transceivers. The apparatus and method may identify a channel including the frequency determined for automatically tuning the radio receiver or transceiver to the channel including the radio frequency signal. By automatically tuning the receiver or transceiver, a transmission can be monitored or a conversation in progress can be joined.

BACKGROUND

Apparatus for determining the frequency of an electrical signal has long been known. A conventional apparatus for determining the frequency is usually referred to as a frequency counter and frequently includes a visual display showing in digital form the frequency measured. The apparatus typically counts the number of cycles of an incoming signal during a sampling period. Some of the prior art frequency counters inhibit display of a count unless the signal detection method used by the counter indicates that a dominant signal is present in signals input to the frequency counter.

Frequency agile radio receivers are available that allow a listener to monitor conversations on each of numerous fixed frequencies. The receiver may monitor fixed frequencies or channels, tuning one at a time, typically in response to programmed instructions. These receivers typically include a memory in which frequency information for tuning the receiver is stored. The receivers are usually programmable for altering or establishing the stored frequency information and monitoring process. The programming feature permits the stored frequency information to be changed, for example, in response to location changes or changes in frequency allocation information. However, when a frequency agile radio receiver is in operation in an area where there are many transient transmitters, for example, mobile transceivers. The user of the frequency agile radio receiver may not know the frequencies of transmission of the nearby transmitters. The typical receiver is incapable of determining the frequencies of these transmissions so the receiver cannot tune to monitor them. Since listeners desire to monitor these nearby transmissions, it is desirable to include, within the radio, apparatus for determining the channel including the frequency of these nearby transmissions and, preferably, to provide for manual or automatic tuning of the radio receiver to that channel for monitoring them.

Some prior art frequency counters for tuning radio receivers have been available in housings separate from the receivers and connected to the receivers by cables, making use awkward. Counting of the frequency and tuning of the associated receiver are disadvantageously slow because the special purpose counters require at least two complete frequency determinations before producing an output.

Accordingly, there is a need for a frequency determining and radio tuning apparatus that can rapidly and accurately determine the frequency of a received radio frequency signal, that can ensure that only the frequency of a coherent signal is determined, and that, in application to a radio receiver, can tune the receiver to the channel including the frequency determined before loss of the signal.

SUMMARY OF THE INVENTION

Accordingly, it is an object of the invention to provide a frequency determining apparatus and method that rapidly determines the frequency of a received radio frequency signal, measuring the frequency only if the signal is coherent.

It is another object of the invention to provide a frequency determining apparatus and an interconnected frequency agile radio receiver and a method for automatically tuning the radio receiver to a channel including a frequency determined by the frequency determining apparatus.

According to a further object of the invention, a frequency determining apparatus and an interconnected frequency agile radio receiver determine the frequency of a received radio frequency signal, determine whether the signal is from a mobile transmitter, and, is so, tune to receive signals from a repeater transmitter associated with the mobile transmitter.

Yet a further object of the invention is to provide a frequency determining apparatus and a frequency agile radio receiver in the same housing and sharing common circuitry.

It is still another object of the invention to provide a radio transceiver incorporating a frequency determining apparatus and method so that a channel including the frequency of a received signal is accurately and quickly determined and the transceiver transmitter and receiver are automatically tuned to the frequency determined for joining an ongoing conversation.

According to one aspect of the invention, a frequency determining apparatus includes a counter for counting amplitude transitions of a radio frequency signal in each of a plurality of time periods of identical duration, a first register for storing counted zero amplitude transitions for a selected one of the time periods, and a second register for storing an accumulated count of zero amplitude transitions counted during a total counting time including the plurality of time periods; and comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends.

According to a second aspect of the invention, the frequency of a radio signal is determined by counting zero amplitude transitions of a radio frequency signal in each of a plurality of time periods of identical duration, storing counted zero amplitude transitions for a selected one of the time periods storing an accumulated count of zero amplitude transitions during a total counting time including the plurality of time periods; comparing counted zero amplitude transitions for each time period other than the selected time period with the counted zero amplitude transitions for the selected time period, discarding the accumulated count if the counted zero amplitude transitions for any of the time periods other than the selected time period are different from the counted zero amplitude transitions for the selected time period by more than a quantization error, accumulating counted zero amplitude transitions until the total counting time is reached; and determining the frequency of the radio frequency signal from the accumulated count stored when the total counting time is reached.

According to a third aspect of the invention, a radio apparatus comprises a radio receiver including an antenna for collecting electromagnetic energy, and receiver circuits for processing radio frequency signals received through the antenna and for producing an output, and a frequency determining apparatus including a counter for counting zero amplitude transitions of a radio frequency signal in each of a plurality of time periods of identical duration, a first register for storing counted zero amplitude transitions for a selected one of the time periods a second register for storing an accumulated count of zero amplitude transitions counted during a total counting time including the plurality of time periods; and comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends and the frequency determining apparatus supplies the frequency determined to the radio receiver for tuning of the radio receiver.

According to a fourth aspect of the invention, a radio receiver is tuned to a channel including a frequency of a received radio frequency signal, the frequency of the received signal being determined by counting zero amplitude transitions of a received radio frequency signal in each of a plurality of time periods of identical duration, storing counted zero amplitude transitions for a selected one of the time periods storing an accumulated count of zero amplitude transitions during a total counting time including the plurality of time periods; comparing counted zero amplitude transitions for each time period other than the selected time period with the counted zero amplitude transitions for the selected time period, discarding the accumulated count if the counted zero amplitude transitions for any of the time periods other than the selected time period are different from the counted zero amplitude transitions for the selected time period by more than a quantization error; accumulated counted zero amplitude transitions until the total counting time is reached; determining the frequency of the received radio frequency signal from the accumulated count stored when the total counting time is reached; and tuning the radio receiver to a channel including the frequency determined.

According to a fifth aspect of the invention, the frequency of a received radio frequency signal is determined by counting zero amplitude transitions of the radio frequency signal and storing an accumulated count of zero amplitude transitions counted; determining the frequency of the received radio frequency signal from the accumulated count of zero amplitude transitions accumulated during a total counting time; tuning a radio receiver having a pass band to a channel including the frequency determined; and, after tuning, determining whether a signal is being received within the pass band of the radio receiver for confirming accuracy of the frequency determined.

According to a sixth aspect of the invention, a radio apparatus comprises a radio receiver including an antenna for collecting electromagnetic energy, and receiver circuits for processing radio frequency signals received through the antenna and producing an output and including a tuner tuning only to allocated frequency channels, and a frequency determining apparatus for determining the frequency of a radio frequency signal received from the antenna, wherein the radio receiver includes a memory coupled to the tuner and to the frequency determining apparatus for storing frequency information for channels allocated to mobile transmitters and frequency offsets between mobile transmitters and repeater transmitters repeating transmissions of the mobile transmitters and, when the radio receiver determines that a channel for which a radio frequency signal has been received and the frequency determined by the frequency determining apparatus is allocated to a mobile transmitter, the tuner is tuned to a frequency offset from the channel including the radio frequency signal for which the frequency has been determined, by the offset stored in the memory, for detecting a radio frequency signal transmitted from a repeater transmitter.

According to a seventh aspect of the invention, a method of tuning a radio receiver comprises determining the frequency of a received radio frequency signal at a radio receiver including a tuner tuning only to allocated frequency channels and a memory coupled to the tuner and storing frequency information for channels allocated to mobile transmitters and frequency offsets between mobile transmitters and repeater transmitters repeating transmissions of the mobile transmitters; and determining whether a channel including a frequency determined from a received radio frequency signal is allocated to a mobile transmitter, and, if so, tuning the radio receiver to a frequency offset from the channel including the radio frequency signal for which the frequency has been determined, by the offset stored in the memory, for detecting a radio frequency signal transmitted from a repeater transmitter.

According to an eighth aspect of the invention, a radio apparatus comprises a frequency agile radio receiver including an antenna for collecting electromagnetic energy, a bandpass filter connected to the antenna and having a pass band passing radio frequencies within a first range of radio frequencies, and rejecting frequencies outside the first range of frequencies; receiver circuits for processing radio frequency signals received through the antenna and producing an output, a radio frequency preamplifier amplifying a radio frequency signal received from the antenna through the bandpass filter; and a microprocessor controlling tuning of the frequency agile radio receiver; and a frequency determining apparatus for determining the frequency of a radio frequency signal received from the antenna and through the bandpass filter.

DETAILED DESCRIPTION

Radio Receiver with Frequency Determination

Figure 1:
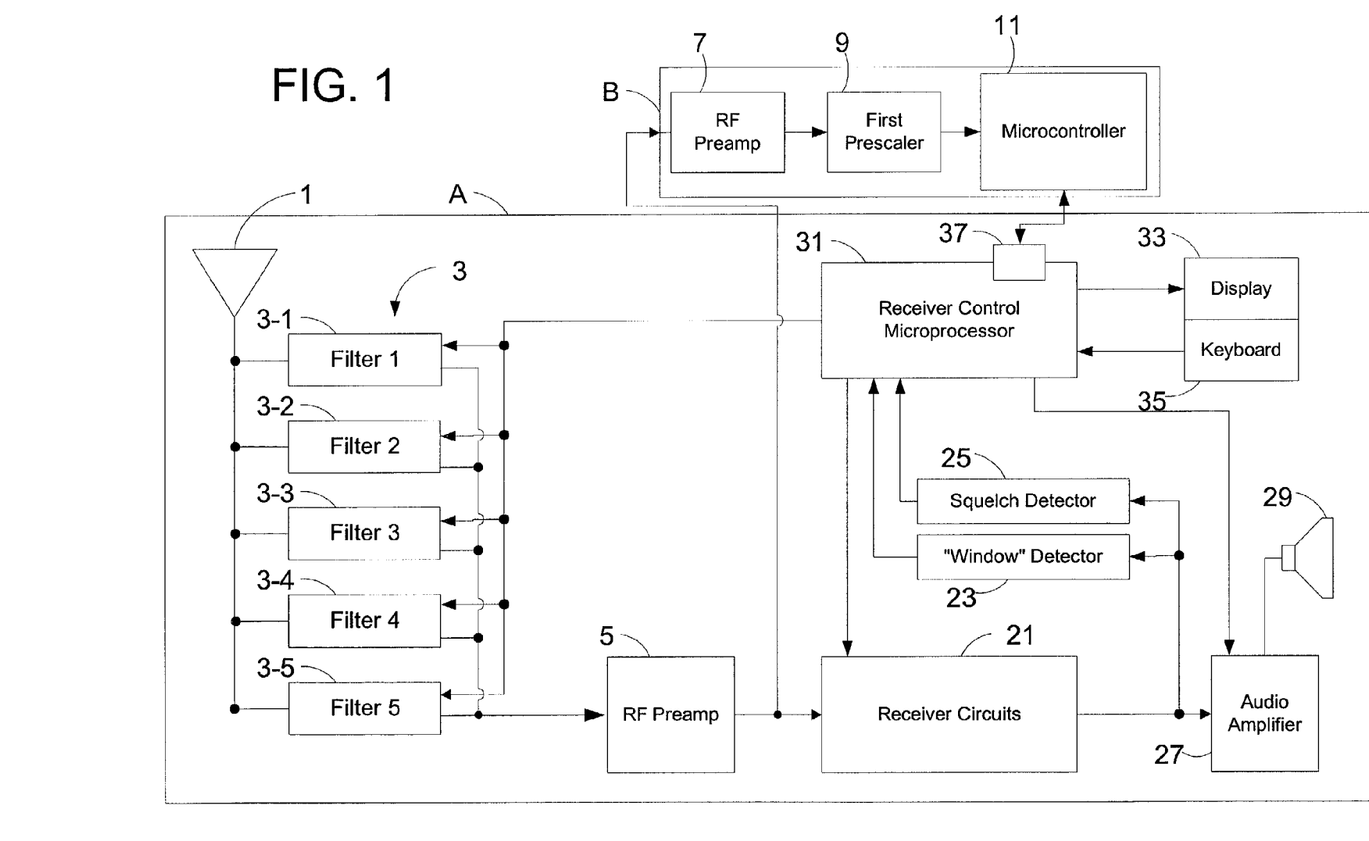
FIG. 1 is a block diagram of a radio receiver apparatus incorporating an embodiment of the frequency determining apparatus and method according to the invention.
Figure 2:
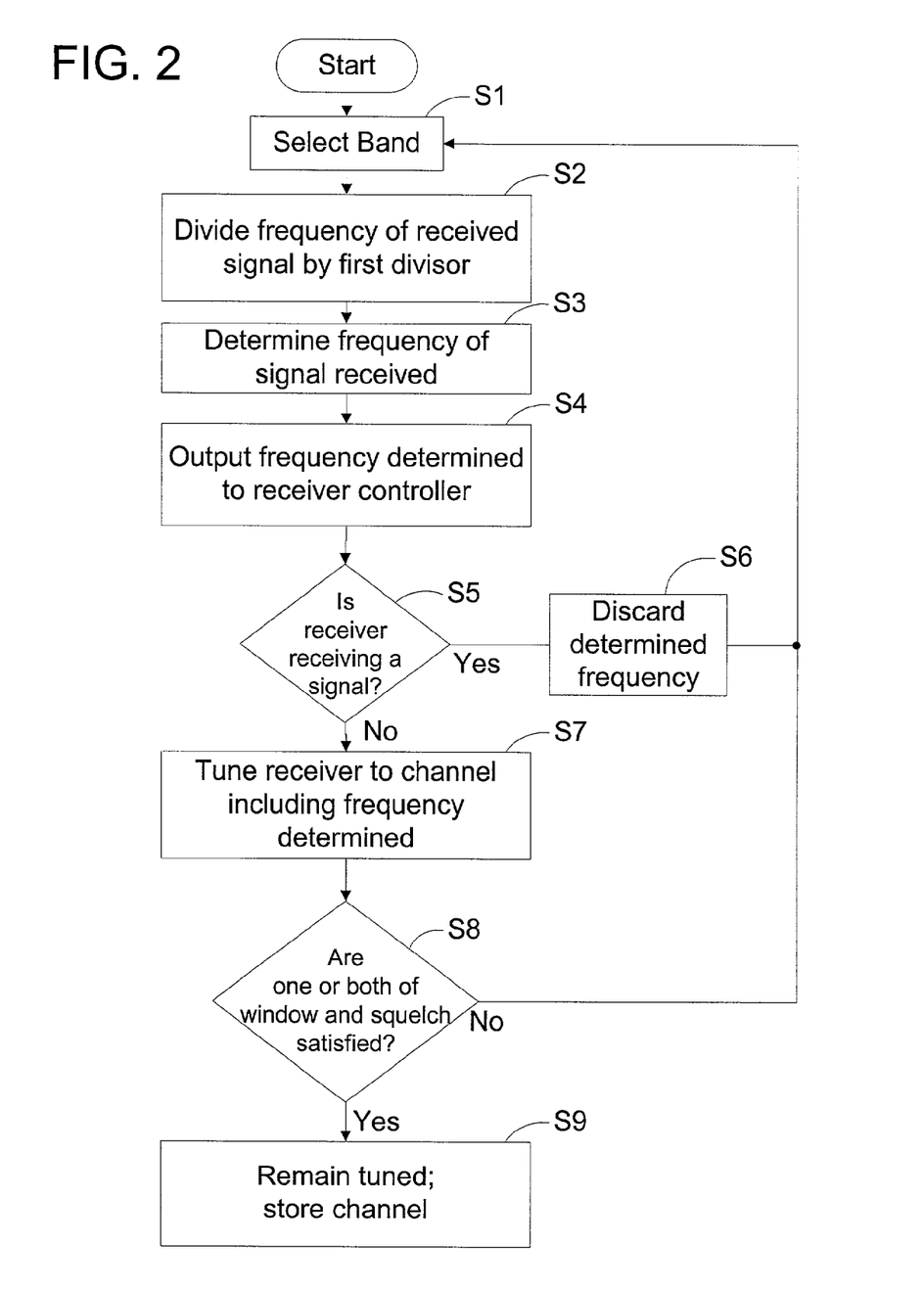
FIG. 2 is a flow chart illustrating the process by which the apparatus of FIG. 1 operates.
Figure 3:
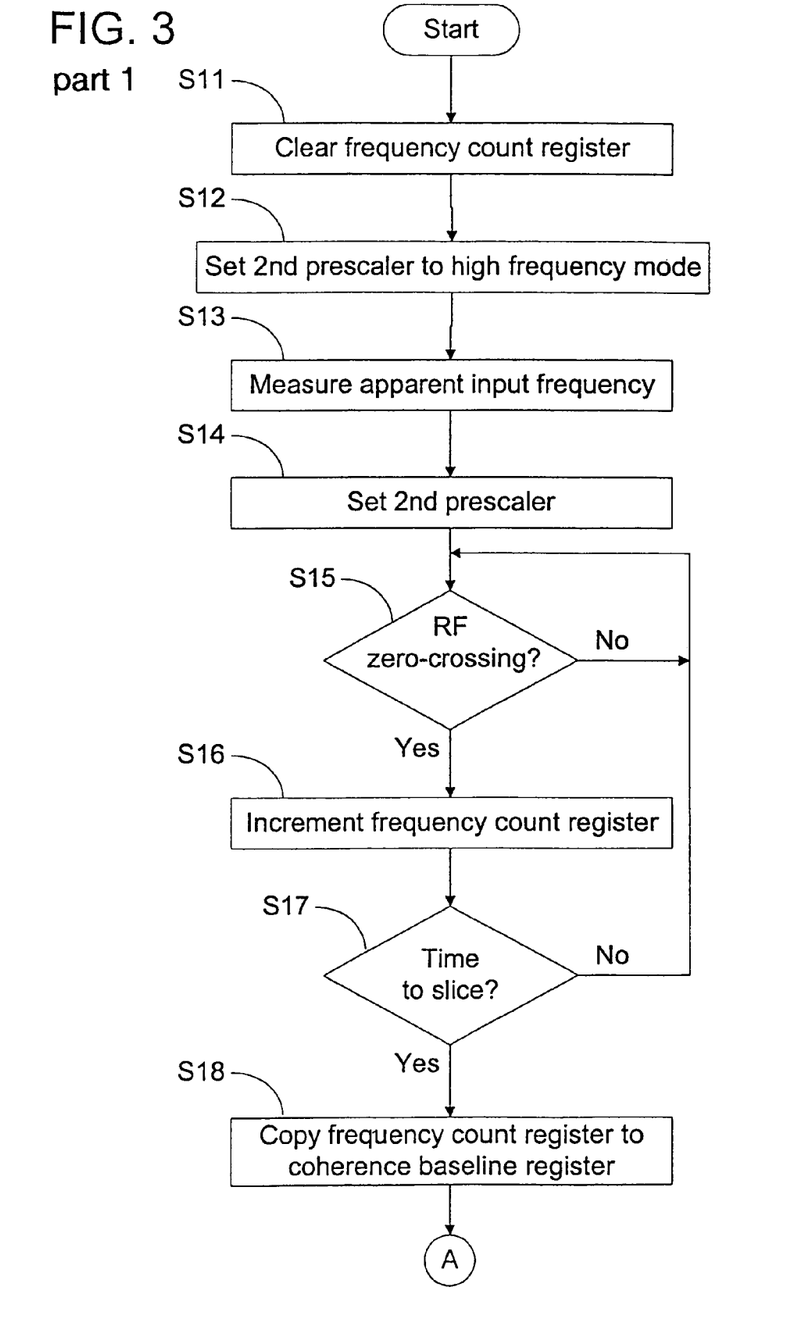
FIG. 3 is a flow chart illustrating a frequency determining method according to an embodiment of the invention.

FIG. 1 is a block diagram of a frequency agile radio apparatus including an apparatus for determining the frequency of a radio frequency signal according to an embodiment of the invention. FIG. 2 is a flow chart illustrating a method of operation of radio receiver apparatus like that of FIG. 1 according to an embodiment of the invention. FIG. 3 is a flow chart illustrating the frequency determination method and apparatus exemplified by FIGS. 1 and 2. In the following description, emphasis is placed upon use of the invention in connection with a frequency agile receiver that receives radio frequency signals. However, the invention has several aspects and is not limited to application in radio receivers. For example, the frequency determination aspect of the invention may be generally applied to any frequency determination of a radio frequency signal, for example, through a directly connected circuit, without the reception of electromagnetic waves propagated from a transmitting antenna.

In the embodiment of FIG. 1, a radio receiver A that is frequency agile, i.e., can be tuned to various frequencies by an internal microprocessor, is interconnected with a frequency determining apparatus B. The receiver A includes an antenna 1 connected to a bandpass filter 3. The bandpass filter 3 desirably eliminates unwanted electromagnetic energy, including noise, outside a frequency range of interest. Further, although shown as a discrete element in FIG. 1, the bandpass filter 3 may be a part of a radio frequency amplifier or amplifiers used in conjunction with the filter element rather than a distinct circuit. In the illustrated embodiment, the bandpass filter 3 includes multiple filter elements. The illustrated embodiment includes five such filter elements. Each individual bandpass filter element has a particular pass band, different in frequency range from the pass bands of the other filter elements. In the illustrated embodiment, bandpass filter elements 3-1, 3-2, 3-3, 3-4, and 3-5 are illustrated. As discussed below, only one of these filter elements is connected at any particular time for providing to the signal processing circuitry of the receiver A whatever radio frequency signals are received at the antenna 1 and that fall within the pass band of the filter element that is connected at that time.

In a frequency determination mode, each of the bandpass filter elements is connected, in sequence, for a time sufficient for determining the frequency of a received signal falling within the pass band of the connected filter element. As a non-limiting example, when the invention is applied to a radio receiver intended to monitor communications between transceivers, one or both of which may be mobile or fixed, the filter element 3-1 may have a bandpass frequency range of 30–54 MHz. The frequency ranges of the other filter elements may be, for example, 108–136 MHz, 136–174 MHz, 406–512 MHz, and 806–956 MHz. These frequency ranges, as an example, include standard communication frequency bands and avoid commercial broadcast frequencies. By describing a bandpass filter with five filter elements, it is not intended to require a multiple element filter in all or any applications of the invention. A single bandpass filter or even no bandpass filter may be appropriate for particular applications of the invention, for example, in simple frequency determinations.

The Frequency Determining Apparatus

The output signal from the bandpass filter 3 is, preferably, amplified in a radio frequency preamplifier 5 to improve the sensitivity of the apparatus to relatively weak radio frequency input signals. The amplified radio frequency signal provided by the preamplifier 5 is supplied to the signal processing circuitry of the radio receiver A and to the frequency determining apparatus B. The frequency determining apparatus B includes an optional radio frequency preamplifier 7. This preamplifier 7 is optional in the illustrated receiver because the preamplifier 5 of the radio receiver may provide sufficient gain for both the receiver A and the frequency determining apparatus B. In fact, a single preamplifier may serve both of the frequency determining apparatus and the frequency agile radio receiver. The joint usage of a single element is an example of one aspect of the invention in which a commonly housed frequency counter and radio receiver share many common circuits, providing substantial economies. When the frequency determining apparatus B stands alone and is not part of nor connected to a radio receiver, inclusion of the preamplifier 7 is highly desirable to increase sensitivity and improve overall performance.

The further amplified radio frequency signal from the preamplifier 7 is supplied to an optional first prescaler 9. When the highest frequency signal for which the frequency is to be determined is very high, it is useful to divide the frequency of the signal, i.e., to lower the frequency of the signal to be processed, before attempting to determine the frequency of the signal. Otherwise, the processing circuitry for determining the frequency can become quite complicated and expensive, particularly in processing frequencies, for example, that approach one GHz. The first prescaler 9 is a commercially available integrated circuit, for example, the SA701 available from Phillips Semiconductors, Sunnyvale, Calif. Preferably, the first prescaler 9 has a constant divisor by which it divides the frequency of the signal supplied to its input, regardless of the frequency, in order to produce a reduced frequency signal at its output.

It is preferred, in the invention, that the frequency of the signal output by the first prescaler 9 not exceed about 10 MHz for ease of processing the output signal from the first prescaler 9 without unusual circuitry. For example, the divisor of the first prescaler 9 may be set to 128, with regard to the specific, non-limiting example of the frequency ranges of the bandpass filter 3 previously described, to ensure that the output frequency of the prescaler does not exceed 10 MHz. In another, less preferred, embodiment, if the divisor of the first prescaler 9 is variable, for the example for the frequency ranges provided by the filter elements 3-1–3-5 described above, the divisor of the first prescaler 9 might be set at 8 for the frequency range of the filter element 3-1, 16 for the filter element 3-2, 32 for the filter element 3-3, 64 for the filter element 3-4, and 128 for the filter element 3-5. A connection to the first prescaler 9 from the radio receiver A is shown in FIG. 1 that is only present if the divisor of the first prescaler is variable and controlled in coordination with the selection of one of bandpass filter elements 3-1–3-5 by the radio receiver.

As shown in FIG. 1, the first prescaler 9 supplies an output signal to a microcontroller 11 of the frequency determining apparatus B. Since the preamplifier 7 and the prescaler 9 are both optional, the frequency determining apparatus B may, in some embodiments, consist only of the microcontroller 11. The microcontroller 11 may be, for example, a PIC 12C672 microprocessor commercially available from Microchip Technology of Chandler, Ariz. The microcontroller 11 receives the radio frequency signal, adjusted by the preamplifier 7 and the first prescaler 9, if present. The microcontroller 11 provides an output signal, in the embodiment of FIG. 1, to the radio receiver A.

The Radio Receiver

Turning again to the radio receiver A, the radio receiver A in the portions now discussed may be entirely conventional, except for the interaction with the frequency determining apparatus B. For example, the radio signal processing and control circuits may be those of the Uniden Model BC245XLT, a frequency agile radio receiver tuned in receiving frequency in response to execution of programmed instructions by an internal microprocessor. The circuits in the radio receiver that are conventional are, therefore, only described with respect to their well known functions.

In the radio receiver A, the amplified radio frequency signal from the preamplifier 5 is supplied to conventional receiver circuits 21. The conventional receiver circuits 21 include, for example, a first detector, a local oscillator and associated tuner for producing an intermediate frequency (IF) signal, IF amplifier stages, and a second detector circuit. The output of these conventional receiver circuits 21 is a demodulated signal including any received audio and a DC component indicating the location of the received signal within the pass band of the receiver. The receiver pass band is different from the pass bands of the bandpass filter 3 and its filter elements 3-1 3-5 described above. The receiver pass band is typically relatively narrow, for example, 25 kHz in width.

The signal output by the conventional receiver circuits 21 is supplied to three circuits, namely, a window detector 23, a squelch detector 25, and an audio amplifier 27. The window detector 23 produces a signal proportional to the location of the received signal position within the pass band of the receiver based on the DC component of the output signal of the receiver circuits 21. The output signal of the window circuit is subjected to a threshold test in the conventional receiver. In the invention, a second threshold test, independent of the conventional receiver's threshold test, is applied to determine whether the signal being received is near the center of the receiver pass band. The squelch detector 25 indicates whether a signal is being received by the receiver. The squelch detector 25 produces a two-state output signal, a first output that is used as a muting signal to prevent audio noise from being heard when no signal is being received. That noise disappears when a signal is actually being received by the receiver. In that event, the other state output signal is supplied by the squelch detector 25 as an un-muting signal that permits the audio in the signal being received to be reproduced and heard. The un-muting and muting signals are supplied to and control operation of the audio amplifier 27 so that audio is only heard when a signal is being received. When the squelch and window detectors indicate that a signal is being received and is within the receiver pass band, the audio is produced at an audio output device 29. FIG. 1 indicates output through a speaker as a generic audio output, but headphones and other sound reproducing apparatus can be employed as well.

The radio receiver A is controlled in its operation by a receiver control microprocessor 31. The microprocessor 31 receives the outputs of the window detector 23 and squelch detector 25, processes their outputs, and sends an un-muting signal, when appropriate, to the audio amplifier 27. The microprocessor 31 controls frequency tuning of the receiver by sending a tuning signal to the tuner within the conventional receiver circuits 21. In coordination with that tuning, the microprocessor controls the particular filter element 3-1–3-5 employed in a particular receiving state in coordination with the tuning of the receiver circuits 21. Further, a display 33 is connected to the microprocessor 31 to display various information, for example, the channel to which the radio receiver A is tuned and information used, for example, in programming or controlling the apparatus generally. Likewise, a keyboard 35 through which instructions and information are supplied to the apparatus, for example, in programming and providing other instructions for operation of the radio receiver A, is connected to the microprocessor 31. Finally, the microprocessor 31 includes a data port 37 receiving a signal from the microcontroller 11, indicating a frequency determined by the microcontroller and used in tuning the radio receiver A as described below. Likewise, the connection provides for sending of control signals from the microprocessor 31, for example, regarding a frequency to which the receiver is tuned, to the microcontroller 11. That information might be used in establishing a divisor of a second prescaler within microcontroller 11 that is described below. The conventional receiver circuits 21 include an oscillator generating a highly precise clock for synthesized tuning of the receiver A. That clock is preferably also used by the microcontroller 11 so that a second precision oscillator, a relatively expensive circuit, is unnecessary. The sharing of a common high precision clock circuit between the radio receiver A and the frequency determining apparatus B is another example of an economy achieved in an embodiment in which the receiver and frequency determining apparatus are commonly housed.

Radio Receiver Operation

The operation of the radio receiver A and of frequency determining apparatus B are described in conjunction with the flow charts of FIGS. 2 and 3. Turning first to the flow chart of FIG. 2, in step S1, if there is a multiple element bandpass filter, one of the filter elements is selected, i.e., a normally open switch is closed, thereby connecting the selected filter element to the preamplifier 5. The amplified radio frequency signal is also supplied, for the specific embodiment depicted in FIG. 1, to the preamplifier 7, if present, and, thereafter, as indicated in step S2, to the prescaler 9, if present. For the purposes of this example, it will be assumed that the first prescaler 9, if present, has a fixed value first divisor. That first divisor of the first prescaler 9 is applied to produce an output signal of reduced frequency as compared to the input signal in Step S2. In step S3, the frequency of the signal supplied to the microcontroller 11 is determined. That process in the microcontroller 11 of frequency determination apparatus is described below in connection with and as part of the description of FIG. 3.

In one embodiment of the specific application being described, the frequency determined in step S3 is employed to tune the radio receiver A to a channel that incorporates the frequency but may have a center frequency different from the frequency determined in step S3 by the microcontroller 11. The tuning of the radio receiver A is achieved by the receiver control microprocessor 31 in response to a signal indicating the determined frequency and supplied to the data port 37 of the receiver control microprocessor 31. Once that tuning has been accomplished, the microprocessor 31 responds to the outputs of one or both of the window and squelch detectors 23 and 25. One or both of these responses may be tested. Preferably, the failure of either test, indicating improper tuning, terminates the frequency determination cycle underway and the process returns to step S1.

The output of the squelch detector may be tested to determine if it is a muting signal or an un-muting signal. If the squelch circuit is quieted by an incoming signal and produces the un-muting signal, there is confirmation that a signal is present in the receiver pass band. If the output of the window detector indicates that a signal being received is near the center of the pass band of the receiver, then there is initial or further confirmation that the channel corresponding to the frequency of the received signal has been accurately determined. If any of whichever of these optional window detector and squelch detector tests is applied fails, then microprocessor 31 recognizes that no signal is being received and the radio receiver A may revert to its former tuning. The microprocessor 31 includes a memory and, upon successful verification that a received signal has been accurately tuned, applying one, both, or neither of the window detector and the squelch detector tests, the channel of the received signal may be stored in step S7 in the memory as frequency information for future reference in monitoring transmission of the channel.

An important feature of the invention concerns the tuning function. The frequency determination process operates in the background while the radio receiver A operates under other control instructions from the microprocessor 31, for example, fixed in tuning to a channel where a transmission is present or scanning for transmissions on established channels of interest. In a preferred embodiment, once a preliminary frequency determination has been made in step S3 and output to the receiver controller in step S4, the receiver is tested in test S5 to determine whether the receiver is currently receiving a signal. This test S5 is made by checking whether the squelch detector is producing a muting or un-muting signal. If an un-muting signal is being produced by the squelch detector indicating that a signal is being received, the process moves to step S6 where the new frequency determination is discarded. Then the process returns to step S1.

If, in test S5, it is determined that the squelch detector is producing a muting signal so that no signal is currently being received, then the process moves to step S7 and the receiver is tuned to the channel including the newly determined frequency. Thereafter, the signal on that channel is subjected to one or both of the squelch detector and window detector tests in test S8. Most preferably, at least the squelch detector test is applied. Then, upon passage of whatever tests are applied at test S8, the receiver may remain retuned to monitor the channel including the newly determined frequency and the channel including the newly determined frequency may be stored in a memory in the receiver in step S9. Alternatively, the receiver may resume scanning frequencies after storing the frequency newly determined. If any of the test or tests applied at test S8 are not passed, the process returns to step S1.

The memory within the receiver control microprocessor 31 may include a list of frequencies that are within or outside the pass band of the filter 3 but are not to be monitored. Transmissions of paging systems provide one example. Then, before any automatic retuning of the receiver to a channel including a frequency determined or storage of a corresponding channel, a comparison is made between the list of excluded frequencies and the determined frequency. If the frequency determined or its corresponding channel is in the exclusionary list, then the determined frequency is discarded and the receiver is not retuned for monitoring or further testing and verification of the frequency determined and no new channel information is stored.

The radio receiver and frequency determining apparatus described are particularly useful in monitoring communications of nearby mobile transmitters. The nearby mobile transmitters produce relatively strong signals that may be of particular interest to listeners because the communications concern the area near the listener. With the invention, these relatively strong signals can be detected and their frequencies determined. In some communications systems, mobile transmitters do not transmit and receive directly from a base station but, rather, use higher power repeater stations as an intermediary. Thus, the low power mobile transceiver effectively covers a much larger geographical area of communication than its transmitter would otherwise provide. In many frequency bands, the rules of the Federal Communications Commission require a fixed offset relationship between the frequencies used by the mobile units and the repeater frequencies which retransmit transmissions from the mobile units. Optionally, the memory of the receiver control microprocessor 31 retains information on the frequency offsets of the frequency allocation rules. Then, upon detection of a mobile transmission, the microprocessor 31 can automatically determine the frequency at which the corresponding repeater channel transmits and tune the receiver to that frequency where continued reception of both sides of the communication, i.e., transmissions of both the remote and nearby party, is more likely. After retuning to the repeater channel, one or both of the window and squelch tests can be applied to ensure that the receiver is properly tuned to a repeater frequency. If any of the applied tests fails, then the offset calculation may be inappropriate for the received signal so that the receiver does not remain tuned to the calculated frequency. Optionally, the receiver may be retuned to the channel corresponding to the frequency originally determined.

In the apparatus illustrated in FIG. 1, the switched bandpass filters are commonly used by the frequency determining apparatus and the radio receiver. As already described, although two radio frequency preamplifiers are illustrated in FIG. 1, a single preamplifier may be used for both functions and the radio receiver A and the microcontroller 11 can use a single high precision oscillator for certain operations. In fact, although not illustrated, a single microprocessor may be used in place of the microprocessor 31 and microcontroller 11, performing both the receiver control and frequency determination functions. These and still other common circuits may be shared in combining the receiver and the frequency determining apparatus into an economical single package unit.

The invention provides an apparatus that is simple, lightweight, and inexpensive, and is, therefore, particularly useful in application with frequency agile radio receivers. In that usage, the frequency determining apparatus may be packaged in a housing separate from a frequency agile radio receiver apparatus. The apparatus may include a cable and connector for connection to an input port of such a frequency agile radio receiver. In that event, the apparatus provides sufficient command and frequency information to store a frequency determined in a memory of the frequency scanning radio receiver or to tune the frequency scanning radio receiver to the channel including the frequency determined. More conveniently, as already discussed, the frequency determining apparatus is packaged within the same housing as the frequency agile radio receiver using that circuitry of the receiver that is common to the frequency determining apparatus as part of the circuitry of the frequency determining apparatus.

Frequency Determination

The frequency determination by the frequency determination apparatus B of FIG. 1 is now described with reference to the flow chart of FIG. 3. This apparatus and the associated process are entirely independent of the radio receiver apparatus A but described above in conjunction with the radio receiver to demonstrate one particularly useful application of this aspect of the invention. Further, the description that follows assumes the presence of the first prescaler 9, but that optional element and its associated steps in the flow chart of FIG. 3 may be omitted. As previously noted, the frequency determining apparatus B, in some embodiments and applications, may be no more than the microcontroller 11 appropriately connected and programmed. The process described below for accumulating and manipulating these counts is a preferred, but not exclusive, process since various mathematically equivalent alternatives may be used to achieve the same end.

The microcontroller 11 includes several registers in which zero crossings of an input signal are counted and/or accumulated. One of the registers of the microcontroller 11 is referred to here as a frequency count register. In the first step S11 of the process of FIG. 3, that frequency count register is initialized to zero, i.e., is cleared.

Preferably, the microcontroller 11 includes a prescaling function dividing the frequency of the input signal to aid in processing of the signal and determining its frequency accurately and quickly. The specific microcontroller identified above includes such a feature, referred to here as a second prescaler, having a second divisor. The second prescaler may have a selectable divisor, for example, any binary number between 1 and 256. The second prescaler may also be unused, in which case the prescaler divisor is, effectively, 1. In preferred embodiments of the present invention, the second divisor of the prescaler within the microcontroller 11 is 1, 2, or 4, depending upon the frequency of the signal received.

In order to establish the second divisor of the second prescaler within the microcontroller 11, in step S12 the microcontroller briefly monitors the incoming signal with a second divisor of 1 and counts the zero crossing transitions of the signal to obtain a prescaling count indicating, in step S13, an apparent frequency of the input signal. The time period for monitoring the frequency of the signal received needs only to be sufficiently long to obtain a rough estimate of the frequency. An exemplary time period for determining the second divisor is 10 microseconds, during which time a sufficient number of zero crossing, i.e., amplitude transitions, is observed to estimate the frequency with an accuracy of about 1 to 5 MHz and establish the second divisor set in step S14.

In the invention, as readily understood by one of skill in the art, the amplitude of the signal having a frequency to be determined is unimportant. The first prescaler 9, if present, is preferably insensitive to the maximum amplitude of the received signal and preserves only phase information so that frequency can be accurately determined. One cycle of the signal is determined to have occurred between each pair of successive same-direction (e.g., positive to negative sign) zero amplitude transitions. One zero amplitude transition occurs at each time the amplitude of the signal changes in sign, either from positive amplitude to negative amplitude or from negative amplitude to positive amplitude. Either these same-direction zero amplitude transitions or the successive different direction zero amplitude transitions are observed and counted in order to determine the frequency of the incoming signal, i.e., the number of effective cycles counted in one second. Since the "count" resulting from the counting of only same-direction transitions and from counting all transitions differs by a factor of two (ignoring a potential quantization error discussed elsewhere), it is not important which count is used so long as a frequency calculation from a count properly considers the factor. The preferred microcontroller counts only same-direction transitions. Unless expressly specified otherwise here, "counting zero amplitude transitions" and similar terms encompass both alternatives of counting only same-direction amplitude transitions and counting all amplitude transitions.

The counting of zero amplitude transitions begins at step S15 where the counted amplitude transitions increment a count maintained in the frequency count register that was set to zero in step S11. In the specific microcontroller identified above as usable in the frequency determining apparatus, a free-running counter TMR0 is incremented in response to each cycle at the output of the prescaler 9. This free-running counter is the lowest byte of the frequency count register. The running count of amplitude transitions is accumulated in step S117 of an initial part of the frequency determination process.

In one application of the invention, as already described, the frequency determining apparatus B is used to tune the frequency of a frequency agile radio receiver. The tuning is made to particular channels rather than to specific frequencies. The channel spacing, i.e., a frequency allocation, depends upon the transmitting frequency. For example, at higher frequencies, such as 900 MHz, channel spacing may be 12.5 kHz. At lower frequencies, the channel spacing may be only 5 kHz. Therefore, in order to determine accurately the highest frequency of the frequencies of usual interest, a precision of about 1 part in 72,000 (i.e., $900 \times 10^6 \div 12.5 \times 10^3$) is required. In digital signal terms, at least 72,000 transitions must be counted in order to determine the highest frequency of usual interest with the precision necessary for this application of the invention.

In typical digital signal processing, 8 bit registers, for which the maximum count is 255, are employed. Therefore, the basic 8 bit register, e.g., the lowest byte free-running counter TMR0 referred to above, in the microcontroller 11 that responds to each transition from the prescaler 9, if present, or to the radio frequency signal directly if the prescaler 9 is omitted, is insufficient in maximum counting capacity for the receiver application described here. To provide the necessary count capacity for a precision of one part in 72,000, several 8 bit registers may be used in combination. The use of multiple registers can be accomplished in various ways known to those of skill in the art. For example, registers may be conceptually assembled end-to-end, through programming, so that each overflow bit from a first register is counted in a second 8 bit register, and overflow bits from the second register are counted in a third register. Alternatively, a register may be monitored at regular intervals to determine when each overflow occurs and another register incremented for each such detected overflow.

An important feature of the frequency determination aspect of the invention is the concept of coherency and the determination of the frequency only of "coherent" signals. Incoherent signals are discarded in the course of the frequency determination according to the invention. This feature of the invention is particularly important in applications of the invention to radio receivers so that signals on different frequencies are not confused. Likewise, by determining the frequency of only coherent signals, random noise is rejected in the invention. The coherency test is achieved in the invention by establishing a baseline count of zero amplitude transitions, i.e., zero crossings, for an initial time period of a received signal, extracting a plurality of equal duration time periods from the remaining part of a sampling time, counting zero amplitude transitions in each of those equal duration time periods, successively, and, if there is disagreement between the baseline count and a count in a subsequent time period, determining that the signal is not coherent. Upon determination of lack of coherency during or after counting, the partial or complete results of the frequency determining cycle are discarded. In other words, either a frequency determination in progress is terminated or the result of a complete frequency determination is discarded. A specific example of such a process is now described with reference to FIG. 3.

More specifically, the zero amplitude transitions of the received signal are counted by incrementing the frequency count register in step S16 for a first time period of fixed duration. The first and subsequent time periods of equal duration are sometimes referred to here as time slices. Whether the end of this first time slice has been reached is tested in test S17 after each increment of the frequency count in step S16. An exemplary, but non-limiting, example of the duration of such a time slice is 8 milliseconds. When the test S17 is fulfilled, the value of the count of transitions for the first such time slice is established as the base line count for this sampling. Meanwhile, the counting of amplitude transitions continues, with the frequency count register count copied into a previous count register at step S19. The previous count register is used in further steps of the process.

In the second and subsequent time slices identical in duration to the first time slice, amplitude transitions are counted at test S20 as in test S15, with each count incrementing the frequency count register at step S21. The end of each time slice is detected in test S22. When the end of each subsequent time slice is identified at test S22, a determination is made in step S23 as to whether the received signal has remained coherent. If a received signal is coherent, then the slice count during each of the time slices of equal duration will be exactly the same subject only to an identifiable error. This error, typically referred to in the art as "quantization error", may occur because of the phase of the incoming signal at the beginning and the end of each time slice. The error cannot exceed plus or minus 1 count.

Numerous mathematically equivalent tests may be applied to determine coherency, i.e., whether counts for each time slice do not vary by more than the quantization error. In the preferred embodiment, illustrated in FIG. 3, in step S23, the count stored in the frequency count register, i.e., the total accumulated count at that time, has subtracted from it the count in the previous count register, a count established at step S19. The resulting difference is the count for the time slice just concluded. That difference is stored in a register referred to here as a coherence count register as step S23. In the test S24, the difference stored in the coherence count register is compared to the count in the baseline register, i.e., the count from the first time slice. If the count in the coherence count register differs from the count in the baseline register by more than 1 count, then the received signal is not coherent, the frequency determination in process is aborted, and the process returns to step S11, resetting the frequency count register to zero and starting the frequency determination process again.

For each subsequent time slice for which there is agreement, within quantization error, of the count of the coherence count register and the coherence baseline register, the process moves from test S24 to test S25 as the frequency count register accumulates a total count. The accumulation continues until the end of a total count time without a failure at test S24. For example, in the non-limiting radio receiver embodiment previously mentioned, sixteen such time slices of 8 milliseconds duration each, making for a total count of 256 milliseconds, are used. The total count time is entirely arbitrary as is the duration of each "slice". It is convenient, but not required, that the total count time be an integer multiple of the duration of each "slice" period. In any event, when the total count time ends, the process passes from test S25 to step S26 where frequency is calculated from the total count accumulated in the frequency count register.

Alternatively, the comparison of the counts for each of the time slices, i.e., periods, to the count for the first time period may be delayed until after the end of the total count time. In that alternative embodiment, with reference to FIG. 3, test S24 is postponed until after test S25. Then test S24 is carried out, before the frequency calculation at step S26. Since, in this alternative, no comparison of time slice counts is made until the end of the total count time, there is no termination of the frequency determination process before the end of the total count time, as in the embodiment previously described.

Still more generally, since the objective of the comparison of counts for each time slice is to determine coherency, i.e., whether the counts vary by more than the quantization error, the count for any time slice can be used as the reference count. In other words, one arbitrarily chosen time slice count could be selected, particularly after all time slice counts have been obtained at the end of the total count time, and that selected time slice count compared to all other time slice counts. A time slice count for a time slice other than the first time slice may be selected at any time during passage of the total count time. Then, the selected reference time slice count is compared to the other time slice counts to determine whether there is agreement within the quantization error. With regard to FIG. 3, in this alternative, the step S18 is postponed and occurs at a particular time slice n, where n is an integer. In any event, for best efficiency in processing time and to minimize memory requirements, it is preferred to use the first time slice count as the reference count, Nevertheless, the described alternatives provide equivalent conceptual and practical results.

The accumulated count in the frequency count register is an indicator of and is proportional to the frequency of the signal received. In order to obtain the actual frequency of the signal processed, it is necessary to multiply the total count in the frequency count register by the first and second divisors of the first and second prescalers, if present and used, and to divide by the total count time. For example, in the exemplary embodiment described, the total count is multiplied by 512 when the first prescaler 9 divides the frequency by 128 and the second prescaler divides the frequency by 4, and is divided by 0.256 when the total count time is 256 ms. The frequency determined is an output signal of the microcontroller 11.

The performance of the frequency determining apparatus of FIG. 1 is substantially improved over prior art frequency measurements. A single sampling of a radio frequency signal of sufficient duration to receive a coherent signal is used to determine frequency, providing a more valid and sure response than prior art apparatus requiring multiple samples to determine a potentially inaccurate frequency from one or more incoherent samples. Moreover, unlike the prior art apparatus, in the invention the counting for determining frequency begins at the earliest coherent reception. This feature provides rapid response, for example, determination of frequency and retuning an associated frequency agile radio, typically, in a fraction of a second. Fading signals are more reliably detected and monitored with the invention than in prior art apparatus.

Transceiver Embodiment

Figure 4:
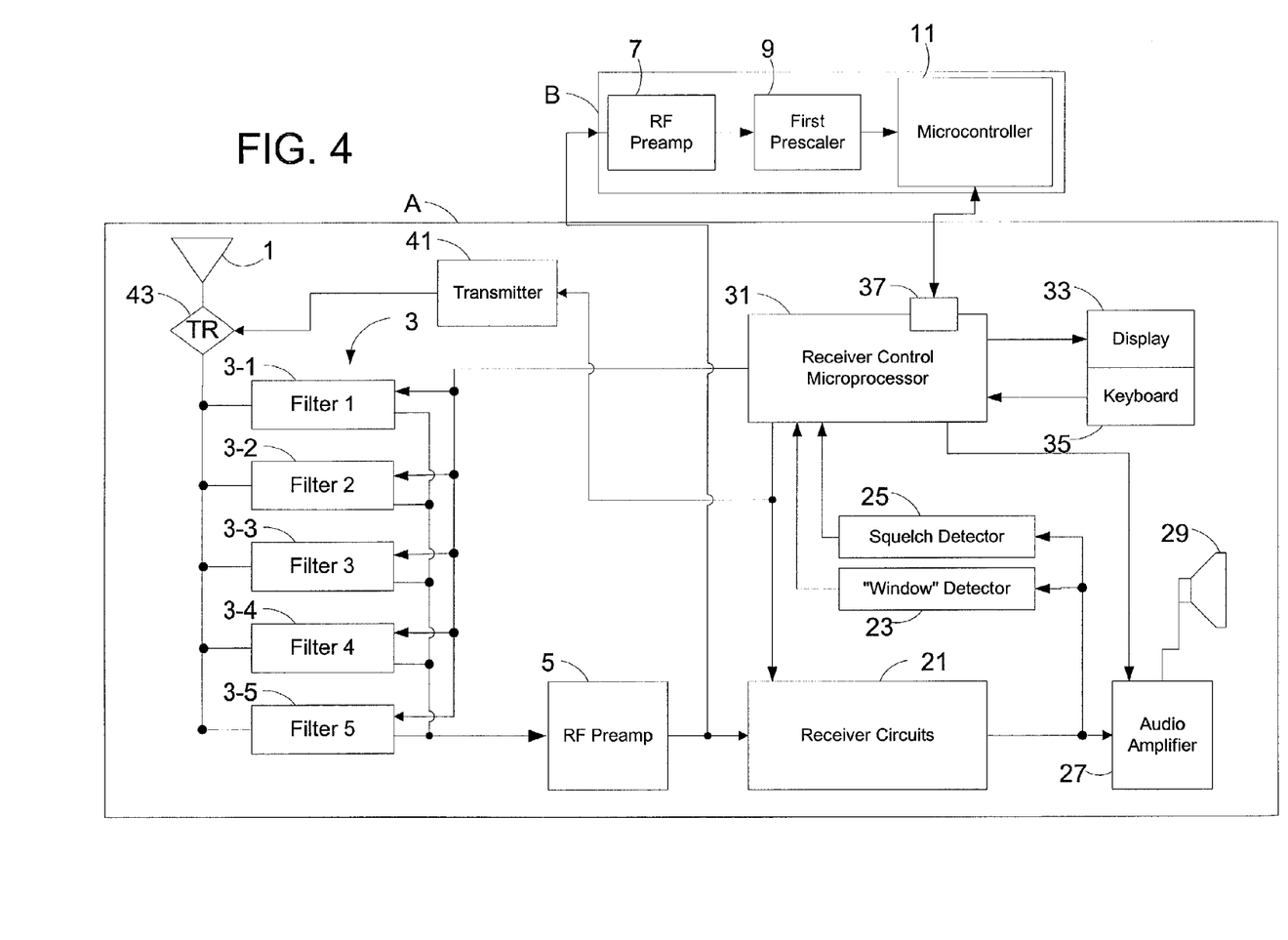
FIG. 4 is a block diagram of a radio transceiver apparatus incorporating an embodiment of the frequency determining apparatus and method according to the invention.

In another aspect of the invention, the radio receiver embodiment of FIG. 1 can be modified to function as a transceiver, as shown in FIG. 4. The radio receiver apparatus A is replaced by a radio transceiver apparatus C including all of the parts of the radio receiver A plus a transmitter 41 connected to the antenna 1 through a transmit/receive switch 43. The transmitter 41 is conventional and is frequency agile, with its tuning being controlled with the same tuning signal supplied by the microprocessor 31 to the receiver circuits 21. When the transmitter 41 is present, upon determination of the frequency of a nearby transmission, both the receiver circuits 21 and the transmitter 41 may be automatically tuned to a channel including the frequency or frequencies (in the event of diplex communication) of communication. In that event, the user of the transceiver can immediately enter into a conversation that is already underway. This feature can be of particular value to EMS, fire, and other rescue personnel.

The invention has been described with respect to certain preferred embodiments. Various additions and modifications within the spirit of the invention will occur to those of skill in the art from the foregoing description. The invention, as defined by the following claims, encompasses all such modifications and variations.

The invention claimed is:

1. An apparatus for determining frequency of a radio frequency signal comprising:
    a counter for counting zero amplitude transitions of a radio frequency signal in each of a plurality of time periods of identical duration;
    a first register for storing counted zero amplitude transitions for a selected one of the time periods;
    a second register for storing an accumulated count of zero amplitude transitions counted during a total counting time including the plurality of time periods; and
    comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends.

2. The apparatus according to claim 1 wherein counting of the zero amplitude transitions is terminated and the accumulated count is discarded before the total counting time ends if the counted zero amplitude transitions for any time period other than the selected time period differ from the counted zero amplitude transitions for the selected time period by more than the quantization error.

3. The apparatus according to claim 1 wherein counting of the zero amplitude transitions continues until the total counting time ends and the accumulated count is discarded after the total counting time ends if the counted zero amplitude transitions for any time period other than the selected time period differ from the counted zero amplitude transitions for the selected time period by more than the quantization error.

4. The apparatus according to claim 1 including a prescaler coupled to the counter for dividing the zero amplitude transitions of the radio frequency signal by a divisor before supplying the radio frequency signal to the counter.

5. A method of determining frequency of a radio frequency signal comprising:
    counting zero amplitude transitions of a radio frequency signal in each of a plurality of time periods of identical duration;
    storing counted zero amplitude transitions for a selected one of the time periods;
    storing an accumulated count of zero amplitude transitions during a total counting time including the plurality of time periods;
    comparing counted zero amplitude transitions for each time period other than the selected time period with the counted zero amplitude transitions for the selected time period;
    discarding the accumulated count if the counted zero amplitude transitions for any of the time periods other than the selected time period are different from the counted zero amplitude transitions for the selected time period by more than a quantization error;
    accumulating counted zero amplitude transitions until the total counting time is reached; and
    determining the frequency of the radio frequency signal from the accumulated count stored when the total counting time is reached.

6. The method according to claim 5 wherein counting of the zero amplitude transitions is terminated before the total counting time ends and the accumulated count is discarded if the counted zero amplitude transitions for any time period other than the selected time period differ from the counted zero amplitude transitions for the selected time period by more than the quantization error.

7. The method according to claim 5, wherein counting of the zero amplitude transitions continues until the total counting time ends and the accumulated count is discarded after the total counting time ends if the counted zero amplitude transitions for any time period other than the selected time period differ from the counted zero amplitude transitions for the selected time period by more than the quantization error.

8. The method according to claim 5 including dividing the zero amplitude transitions of the radio frequency by a divisor before counting the zero amplitude transitions.

9. A radio apparatus comprising:
    a radio receiver including
        an antenna for collecting electromagnetic energy, and
        receiver circuits for processing radio frequency signals received through the antenna and for producing an output, and
    a frequency determining apparatus including
        a counter for counting zero amplitude transitions of a radio frequency signal in each of a plurality of time periods of identical duration;
        a first register for storing counted zero amplitude transitions for a selected one of the time periods;
        a second register for storing an accumulated count of zero amplitude transitions counted during a total counting time including the plurality of time periods; and
        comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends and the frequency determining apparatus supplies the frequency determined to the radio receiver for tuning the radio receiver.

10. The radio apparatus according to claim 9 wherein counting of the zero amplitude transitions is terminated and the accumulated count is discarded before the total counting time ends if the counted zero amplitude transitions for any time period other than the selected time period differ from the counted zero amplitude transitions for the selected time period by more than the quantization error.

11. The radio apparatus according to claim 9 wherein counting of the zero amplitude transitions continues until the total counting time ends and the accumulated count is discarded after the total counting time ends if the counted zero amplitude transitions for any time period other than the selected time period differ from the counted zero amplitude transitions for the selected time period by more than the quantization error.

12. The radio apparatus according to claim 9 wherein the radio receiver includes a squelch detector receiving the output of the receiver circuits and, when a signal received causes the receiver circuits to produce the output, generating an un-muting signal for output of sound by the radio receiver, and the radio receiver, in response to a frequency determination by the frequency determining apparatus, tunes to a channel including the frequency determined, and determines whether the squelch detector produces the un-muting signal, and, if not, disregards the frequency determined.

13. The radio apparatus according to claim 9 wherein the radio receiver has a pass band and includes a window detector receiving the output of the receiver circuits and indicating whether a received signal is centered within the pass band of the radio receiver, and the radio receiver, in response to a frequency determination by the frequency determining apparatus, tunes to a channel including the frequency determined, determines whether the window detector indicates that the signal is centered within the pass band of the receiver, and, if not, disregards the frequency determined.

14. The radio apparatus according to claim 9 wherein the radio receiver includes a memory for storing frequency information in which a channel corresponding to a frequency determined by the frequency determining apparatus is stored.

15. The radio apparatus according to claim 9 wherein the radio receiver includes a memory coupled to the tuner for storing frequency information for channels excluded from reception by the radio receiver wherein, when the frequency determining circuit determines the frequency of a radio frequency signal that falls within a channel excluded from reception, the frequency is discarded and the tuner is not tuned to the channel corresponding to the frequency determined.

16. The radio apparatus according to claim 9 wherein the apparatus includes a transmitter commonly tuned with the radio receiver for transmitting on an allocated frequency channel in response to a determination of the frequency of a radio frequency signal received by the radio apparatus.

17. The radio apparatus according to claim 9 including a bandpass filter connected from the antenna to the receiver circuits and to the frequency determining apparatus and including a plurality of bandpass filter elements having respective pass bands and respectively selected by the radio receiver for individual connection from the antenna to the receiver circuits and to the frequency determining apparatus.

18. A method of tuning a radio receiver to a channel including a frequency of a received radio frequency signal comprising:
    counting zero amplitude transitions of a radio frequency signal in each of a plurality of time periods of identical duration;
    storing counted zero amplitude transitions for a selected one of the time periods;
    storing an accumulated count of zero amplitude transitions during a total counting time including the plurality of time periods;
    comparing counted zero amplitude transitions each time period other than the selected time period with the counted zero amplitude transitions for the selected time period;
    discarding the accumulated count if the counted zero amplitude transitions for any of the time periods other than the selected time period are different from the counted zero amplitude transitions for the selected time period by more than a quantization error
    accumulating counted zero amplitude transitions until the total counting time is reached;
    determining the frequency of the radio frequency signal from the accumulated count stored when the total counting time ends; and
    tuning the radio receiver to a channel including the frequency determined.

19. The method according to claim 18 wherein counting of the zero amplitude transitions is terminated and the accumulated count is discarded before the total counting time ends if the counted zero amplitude transitions for any time period other than the selected time period differ from the counted zero amplitude transitions for the selected time period by more than the quantization error.

20. The method according to claim 18, wherein counting of the zero amplitude transitions continues until the total counting time ends and the accumulated count is discarded after the total counting time ends if the counted zero amplitude transitions for any time period other than the selected time period differ from the counted zero amplitude transitions for the selected time period by more than the quantization error.

21. The method according to claim 18 including, after tuning the receiver to a channel including the frequency determined, determining whether a signal is being received by the receiver.

22. The method according to claim 18 wherein the receiver has a pass band and including, after tuning the receiver to a channel including the frequency determined, determining whether a signal being received is centered within the pass band of the radio receiver.

23. A method of determining frequency of a received radio frequency signal comprising:
    counting zero amplitude transitions of a radio frequency signal received through an antenna and storing an accumulated count of zero amplitude transitions counted;
    determining the frequency of the radio frequency signal received from the accumulated count of zero amplitude transitions accumulated during a total counting time;
    tuning a radio receiver having a pass band to a channel including the frequency determined; and
    after tuning, determining whether a signal is being received within the pass band of the radio receiver for confirming accuracy of the frequency determined.

24. A radio apparatus comprising:
a radio receiver including
an antenna for collecting electromagnetic energy, and
receiver circuits for processing radio frequency signals received through the antenna and producing an output and including a tuner tuning only to allocated frequency channels, and
a frequency determining apparatus for determining the frequency of a radio frequency signal received from the antenna, wherein the radio receiver includes a memory coupled to the tuner and to the frequency determining apparatus and storing frequency information for channels allocated to mobile transmitters and fixed frequency offsets between channels allocated to mobile transmitters and channels allocated to corresponding repeater transmitters repeating transmissions of respective mobile transmitters and, when the radio receiver determines that a channel for which a radio frequency signal has been received and that the frequency determined by the frequency determining apparatus is allocated to a mobile transmitter, the tuner of the radio receiver is tuned to a frequency offset from the channel including the radio frequency signal for which the frequency has been determined, by the fixed frequency offset stored in the memory for that channel, for detecting a radio frequency signal transmitted from a repeater transmitter.

25. The radio apparatus according to claim 24 wherein the frequency determining apparatus includes
a counter for counting zero amplitude transitions of a radio frequency signal in each of a plurality of time periods of identical duration;
a first register for storing counted zero amplitude transitions for a selected one of the time periods;
a second register for storing an accumulated count of zero amplitude transitions counted during a total counting time including the plurality of time periods; and
comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends.

26. A method of tuning a radio receiver comprising:
determining the frequency of a received radio frequency signal at a radio receiver including a tuner tuning only to allocated frequency channels and a memory coupled to the tuner and storing frequency information for channels allocated to mobile transmitters and fixed frequency offsets between the channels allocated to mobile transmitters and channels allocated to corresponding repeater transmitters repeating transmissions of respective mobile transmitters; and
determining whether a channel including a frequency that has been determined from a received radio frequency signal is allocated to a mobile transmitter, and, if so, tuning the radio receiver to a frequency offset from the channel including the radio frequency signal for which the frequency has been determined, by the fixed frequency offset stored in the memory, for detecting a radio frequency signal transmitted from a repeater transmitter.

27. The method according to claim 26 including determining the frequency of the received radio frequency signal by
counting zero amplitude transitions of a received radio frequency signal in each of a plurality of time periods of identical duration;
storing counted zero amplitude transitions for a selected one of the time periods storing an accumulated count of amplitude transitions during a total counting time including the plurality of time periods;
comparing counted zero amplitude transitions for each time period other than the selected time period with the counted zero amplitude transitions for the selected time period;
discarding the accumulated count if the counted zero amplitude transitions for any of the time periods other than the selected time period are different from the counted zero amplitude transitions for the selected time period by more than a quantization error;
accumulating counted zero amplitude transitions until the total counting time is reached; and
determining the frequency of the received radio frequency signal from the accumulated count stored when the total counting time ends.

28. A radio apparatus comprising:
a frequency agile radio receiver including
an antenna for collecting electromagnetic energy,
a bandpass filter connected to the antenna and having a pass band passing radio frequencies within a first range of radio frequencies, and rejecting frequencies outside the first range of frequencies;
receiver circuits for processing radio frequency signals received through the antenna and producing an output,
a radio frequency preamplifier amplifying a radio frequency signal received from the antenna through the bandpass filter; and
a microprocessor controlling tuning of the frequency agile radio receiver; and
a frequency measuring apparatus for measuring the frequency of a radio frequency signal received from the antenna and through the bandpass filter and including
a counter for counting zero amplitude transitions of the radio frequency signal received in each of a plurality of time periods of identical duration;
a first register for storing counted zero amplitude transitions for a selected one of the time periods;
a second register for storing an accumulated count of zero amplitude transitions counted during a total counting time including the plurality of time periods; and
comparing means for comparing counted zero amplitude transitions for each time period other than the selected time period with the counted zero amplitude transitions for the selected time period, the second register discarding the accumulated count if the counted zero amplitude transitions for any of the time periods other than the selected time period are different from the counted zero amplitude transitions for the selected time period by more than a quantization error, wherein the frequency of the radio frequency signal is indicated by the accumulated count stored in the second register when the total counting time ends.

* * * * *